United States Patent [19]

Aoki et al.

[11] Patent Number: 4,574,900
[45] Date of Patent: Mar. 11, 1986

[54] DRIVE MECHANISM FOR TRACK-TYPE VEHICLE

[75] Inventors: Hidekatsu Aoki; Masami Hashimoto, both of Hirakata, Japan

[73] Assignee: Kabushiki Kaisha Komatsu Seisakusho, Tokyo, Japan

[21] Appl. No.: 575,972

[22] Filed: Feb. 1, 1984

[51] Int. Cl.[4] .............................................. B62D 55/12
[52] U.S. Cl. ..................................... 180/6.2; 180/6.7; 180/9.62
[58] Field of Search .......................... 180/6.7, 6.2, 9.62

[56] References Cited

U.S. PATENT DOCUMENTS

| | | | |
|---|---|---|---|
| 3,960,230 | 6/1976 | Van Wuytswinkel | 180/9.62 |
| 4,029,166 | 6/1977 | Haak et al. | 180/9.62 |
| 4,132,134 | 1/1979 | Avery et al. | 180/9.62 |
| 4,506,757 | 3/1985 | Matsumoto et al. | 180/6.7 |

Primary Examiner—Sheldon J. Richter
Attorney, Agent, or Firm—Armstrong, Nikaido, Marmelstein & Kubovcik

[57] ABSTRACT

A drive mechanism for a track-type vehicle has a mechanism for providing selective and facilitated assembly and disassembly thereof. The drive mechanism comprises a first housing which houses a steering clutch and brake assembly and defines a first annular flange, a second housing which houses a final drive assembly and defines a second annular flange engaging with the first annular flange through a movable annular sleeve, a freely connectable and disconnectable connecting shaft mounted between the steering clutch and brake assembly and the final drive assembly, and a connecting and disconnecting mechanism for the connecting shaft.

3 Claims, 5 Drawing Figures

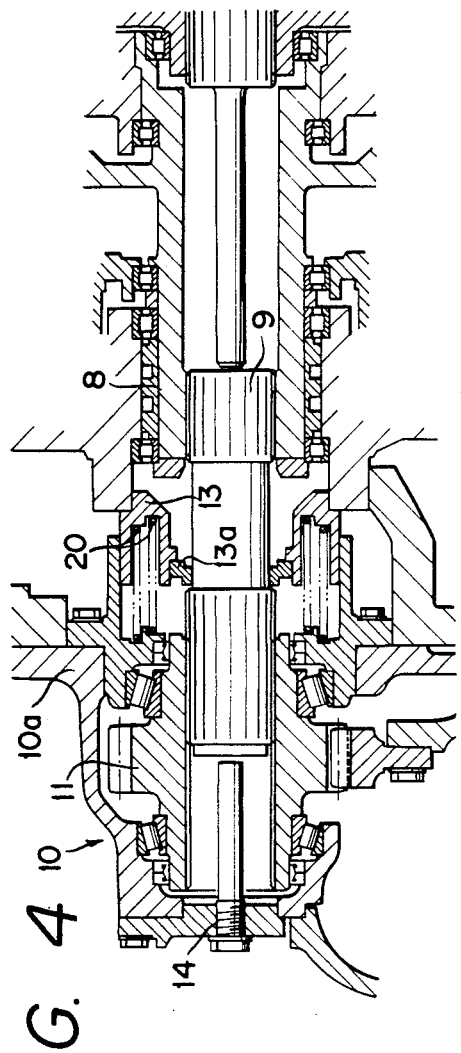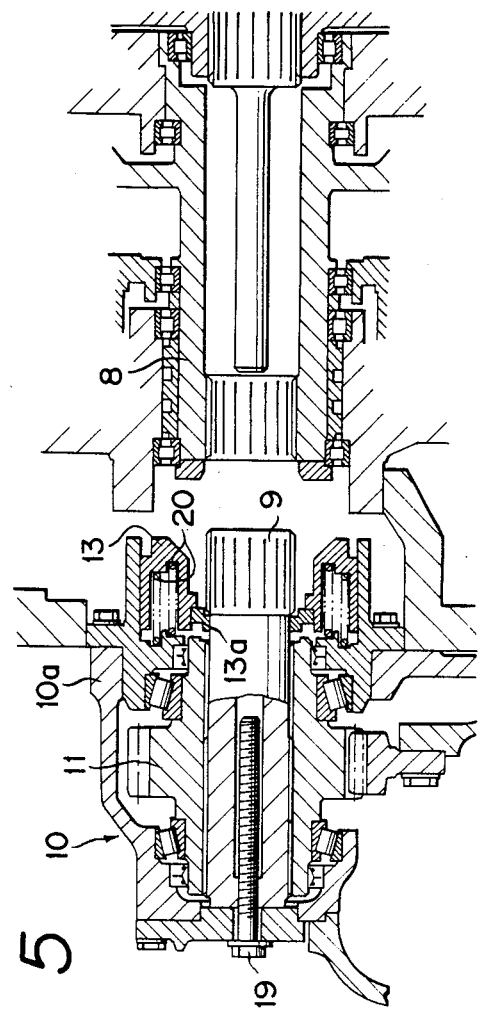

DRIVE MECHANISM FOR TRACK-TYPE VEHICLE

BACKGROUND OF THE INVENTION

1. Field of the Invention

This invention relates to drive mechanisms for track-type vehicles, and more particularly to means for providing selective and facilitated assembly and disassembly of drive mechanisms for track-type vehicles.

2. Description of the Prior Art

The drive mechanisms for the prior art track-type vehicles have the following disadvantages.

Stating in brief, in the drive mechanisms which require frequent maintenance and inspections, assembly and disassembly of them have to be made under the condition that the steering clutch assembly, brake assembly and the final drive assembly are mounted on the vehicle body thus requiring a considerable time and manpower, and there is a risk that at the time of disassembly the hydraulic fluid will flow out from the power drive, and adhere to and soil its surrounding parts, and at the time of assembly the earth and sand deposits on the vehicle body may penetrate into the steering clutch and brake assembly.

One improved power drive devised to eliminate the above-mentioned risk and disadvantage is disclosed in U.S. Pat. No. 4,082,156 issued to Krolak et al. In this drive mechanism, since each of the steering clutch assembly, the brake assembly and the final drive assembly is constructed as an independent unit, these components can be removed separately from the vehicle body as a unit at the time of maintenance and inspections. However, even in cases where maintenance and inspections of the steering clutch assembly and the brake assembly are made, removal of the final drive assembly is required every time. Further, since the steering clutch and brake assembly passes near the track assembly on which the earth and sand etc. adhere when they are removed from the vehicle body, there is still a risk that the earth and sand may penetrate into the steering clutch assembly and the brake assembly.

SUMMARY OF THE INVENTION

The present invention has been contemplated to eliminate the above-mentioned disadvantages of the prior art drive mechanism, and has for its object to provide a drive mechanism for a track-type vehicle which provides selective and facilitated assembly and disassembly.

A further object of the present invention is to provide a drive mechanism for a track-type vehicle wherein the steering clutch and brake assembly is connected to the final drive assembly by a connecting shaft capable of being connected and disconnected freely.

A still further object of the present invention is to provide a drive mechanism for a track type vehicle capable of preventing the earth and sand etc. from adhereing to and penetrating into the steering clutch and brake assembly and the final drive assembly at the time of disassembly of them.

To achieve the aforementioned objects, there is provided a drive mechanism for a track-type vehicle having a bevel gear case which forms a mounting support, a steering clutch and brake unit including a steering clutch and brake assembly, and a final drive unit including a final drive assembly, characterized in that it comprises a first housing which houses said steering clutch and brake assembly and defines a first annular flange; a second housing which houses said final drive assembly and defines a second annular flange engaging with said first annular flange; a freely connectable and disconnectable connecting shaft mounted between said steering clutch and brake assembly and said final drive assembly for operatively connecting the former and the latter assemblies; and a connecting and disconnecting means for said connecting shaft.

Further, according to the present invention, there is provided a drive mechanism for a track-type vehicle, characterized in that said connecting and disconnecting means comprises stoppers mounted on both sides of said connecting shaft, that is, on the respective sides of said first housing and said second housing; and a bolt for use in detaching adapted to be disposed between said second housing and said connecting shaft in place of the stopper mounted on the side of said second housing and threadably engaged with one end of said connecting shaft when the latter is disconnected.

Further, according to the present invention, there is provided a drive mechanism for a track-type vehicle, characterized in that an annular sealing sleeve for connecting said first annular flange and said second annular flange is movably disposed between said flanges.

BRIEF DESCRIPTION OF THE DRAWINGS

The above and many other advantages, features and additional objects of the present invention will become apparent to those skilled in the art upon making reference to the following detailed description and accompanying drawings in which preferred structural embodiments incorporating the principles of the present invention are shown by way of illustrative example.

FIGS. 4 and 5 are fragmentary sectional views showing other embodiments of drive mechanism according to the present invention.

DETAILED DESCRIPTION OF THE PREFERRED EMBODIMENTS

Figure 1:
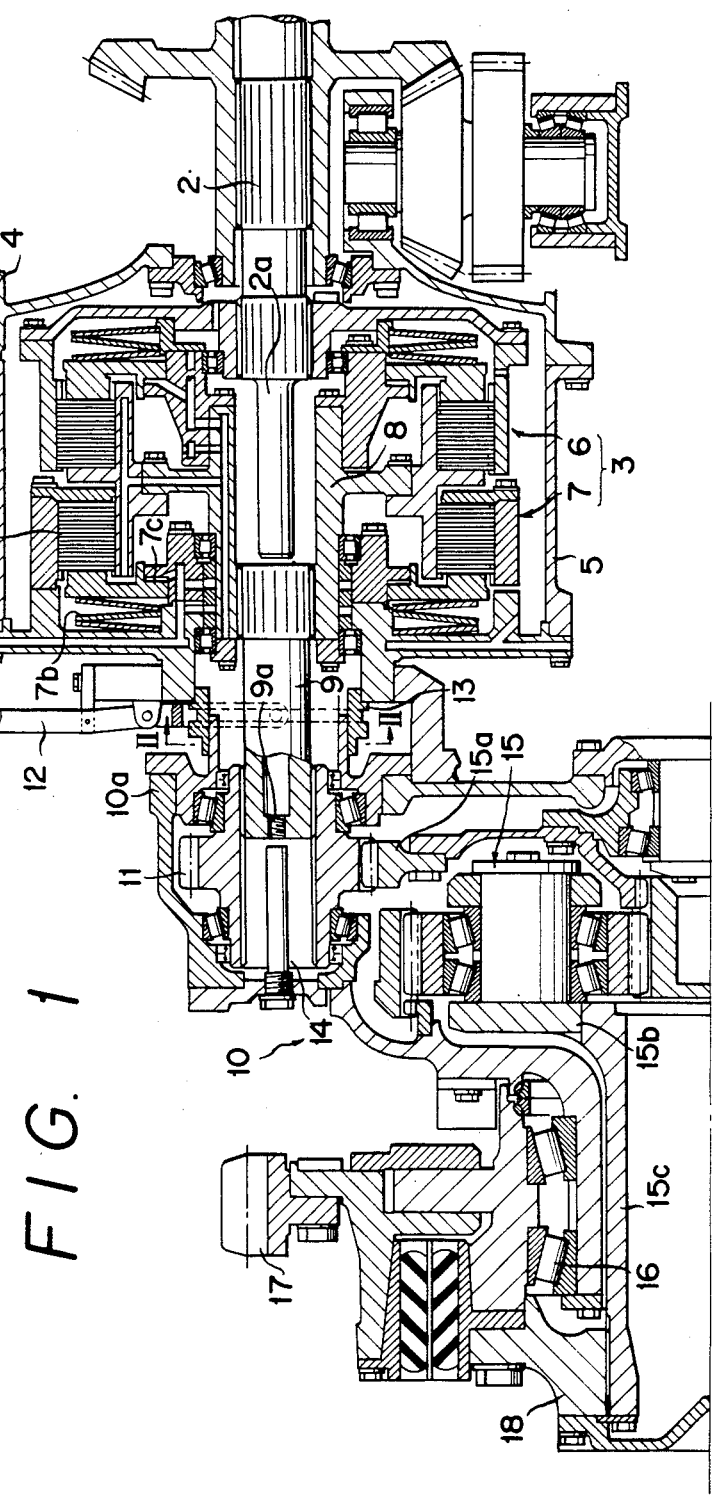
FIG. 1 is a fragmentary schematic sectional view showing one embodiment of a drive mechanism according to the present invention.
Figure 2:
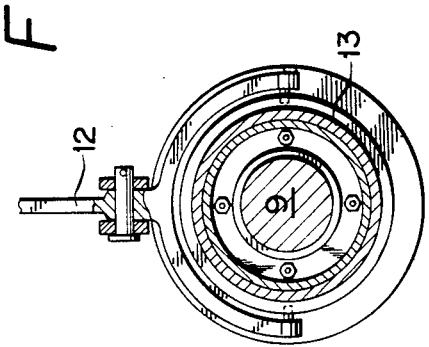
FIG. 2 is a schematic sectional view taken along line II—II in FIG. 1.
Figure 3:
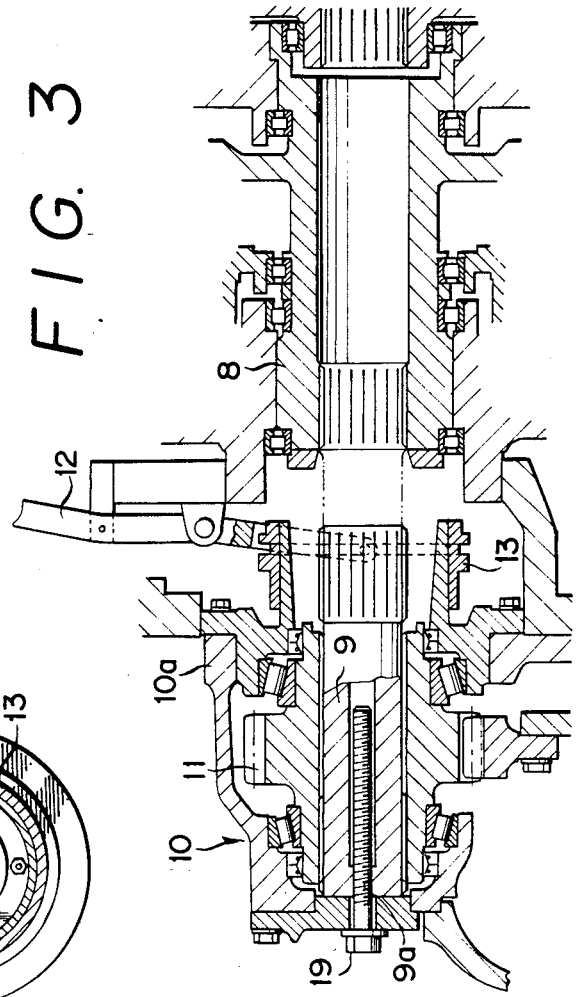
FIG. 3 is a partially enlarged view of FIG. 1 for explaining the operation of the present invention.

In the first place, one embodiment of a drive mechanism of the present invention will be explained with reference to FIGS. 1 to 3.

In the drawings, reference numeral 1 denotes a steering clutch and brake unit which comprises a steering clutch and brake assembly 3, which is formed as a unit and which is mounted on each end of a transverse input shaft 2 (but, only one end is shown in the drawing). The above-mentioned clutch and brake assembly 3 is arranged such that a clutch 6 and a brake 7 are housed in a housing 5 which is freely connected and disconnected from a bevel gear case 4 forming a mounting support so that the motive power transmitted from the engine to the transverse input shaft 2 may be transmitted through said clutch 6 to a sleeve 8 mounted along an extension line of the shaft 2, whilst the brake 7 comprises disks 7a, one of which is engaged by splines with the side of housing 5, and a compression spring 7b which applies a braking force through the disk 7a on the sleeve 8, and supply of the fluid under pressure into a pressure chamber 7c releases the applied braking force.

Whilst, the outer end of the sleeve 8 of the above-mentioned clutch and brake assembly 3 is engaged by splines with one end of a connecting shaft 9. One end of the connecting shaft 9 facing the transverse input shaft 2 is limited in movement towards the shaft 2 by a stopper 2a projecting from the latter, whilst the other end of the connecting shaft 9 is engaged by splines with a pinion 11 of a final drive assembly 10. Further, the other end of the connecting shaft 9 has a threaded hole 9a formed therein and with which the leading end of bolt 19 for use in detaching which will be mentioned later is threadeably engaged. In the final drive assembly 10, the above-mentioned pinion 11 is accommodated in the upper part of the final drive housing 10a. Further, the housing 5 and the final drive housing 10a through both of which the connecting shaft 9 passes are connected by means of a sealing sleeve 13 which can be moved freely by a lever 12 so that the earth and sand or foreign matters may be prevented from entering into the housings 5 and 10a. Further, a stopper bolt 14 is screwed in towards the connecting shaft 9 in the upper part of the final drive assembly housing 10a to limit the leftward movement of the connecting shaft 9, and the pinion 11 meshes with a first stage gear 15a of a planet gear mechanism 15 housed in the final drive assembly housing 10a.

The planet gear mechanism 15 has a carrier 15b from which a final drive shaft 15c extends. One end of a sprocket 17 carried through a bearing 16 by the above-mentioned final drive assembly housing 10a is connected through a connecting member 18 to the leading end of the final drive shaft 15c.

Thus, upon effecting maintenance and replacement of the clutch and brake unit 1, the stopper bolt 14 limiting the leftward movement of the connecting shaft 9 is removed and the bolt 19 for use in detaching is inserted instead so as to threadably engage its leading end with a threaded hole 9a of the connecting shaft 9. Then, the bolt 19 is further rotated. As a result, the connecting shaft 9 is drawn into the pinion 11 as shown in FIG. 3 to allow one end of the connecting shaft 9 to be disconnected from the sleeve 8 of the clutch and brake assembly 3. After that, the lever 12 is turned to move the sealing sleeve 13 towards the pinion 11. As a result, the clutch and brake unit 1 is separated completely from the final drive unit 10 so that only the clutch and brake assembly 3 can be removed from the vehicle body. Further, in case of removing only the final drive unit 10 from the vehicle body, it can be made in the similar manner. Further, when assembly is made again after disassembly, it is only necessary to take a procedure reverse to the above-mentioned procedure.

Further, in the aforementioned first embodiment of the present invention, the clutch and brake unit 1 and the final drive unit 10 are sealed by the sealing sleeve 13 which can be moved freely by the lever 12. As an alternative, however, sealing may be made by means of a cylindrical sealing sleeve 13 biased towards the clutch and brake assembly 3 by an annular compression spring 20 mounted between the sleeve 13 and the final drive assembly housing 10a as shown in FIG. 4. In this case, when the connecting shaft 9 is pulled to the left by means of the bolt 19 for use in detaching, an annular projection 13a engaging with the spline of the connecting shaft 9 is fixedly secured to the inner periphery of the sealing sleeve 13 thereby allowing the sleeve 13 to be pulled towards the final drive assembly housing 10a as shown in FIG. 5. Therefore, there is no need for movement of the sleeve 13 every time the connecting shaft 9 is disconnected.

It is to be understood that the foregoing description is merely illustrative of preferred embodiments of the present invention and that the present invention is not to be limited thereto, but is to be determined by the scope of the appended claims.

What is claimed is:

1. A drive mechanism for a track-type vehicle having a bevel gear case which forms a mounting support, a steering clutch and brake unit including a steering clutch and brack assembly, and a final drive unit including a final drive assembly, said drive mechanism comprising:
   a first housing which houses said steering clutch and brake assembly and defines a first annular flange;
   a second housing which houses said final drive assembly and defines a second annular flange engaging with said first annular flange;
   a freely connectable and disconnectable connecting shaft mounted between said steering clutch and brake assembly and said final drive assembly for operatively connecting said assemblies;
   a connecting and disconnecting means for said connecting shaft; and
   an annular sealing sleeve for connecting said first annular flange and said second annular flange movably disposed between said flanges.

2. The drive mechanism as claimed in claim 1, further including means for moving said annular sealing sleeve comprising a linkage having a lever.

3. The drive mechanism as claimed in claim 1, further including means for moving said annular sealing sleeve comprising an annular compression spring means mounted between said sealing sleeve and said second housing and an annular projection fixedly secured to the inner periphery of said sealing sleeve and adapted to be engaged with a spline of said connecting shaft when the latter is disconnected.

* * * * *